United States Patent
Bruttomesso et al.

(10) Patent No.: US 11,831,671 B2
(45) Date of Patent: Nov. 28, 2023

(54) METHOD FOR AUTOMATIC DERIVATION OF ATTACK PATHS IN A NETWORK

(71) Applicant: Nozomi Networks Sagl, Mendrisio (CH)

(72) Inventors: Roberto Bruttomesso, Morazzone (IT); Alessandro Cavallaro Corti, Varese (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 380 days.

(21) Appl. No.: 17/225,392

(22) Filed: Apr. 8, 2021

(65) Prior Publication Data

US 2022/0329617 A1    Oct. 13, 2022

(51) Int. Cl.
*H04L 29/00*    (2006.01)
*H04L 9/40*    (2022.01)

(52) U.S. Cl.
CPC ................ *H04L 63/1433* (2013.01)

(58) Field of Classification Search
CPC . H04L 63/1433; H04L 41/12; H04L 63/1416; H04L 41/145; H04L 43/04; H04L 63/1408; G06F 11/3608
See application file for complete search history.

(56) References Cited

U.S. PATENT DOCUMENTS

| | | | |
|---|---|---|---|
| 7,200,105 B1 * | 4/2007 | Milliken ............. | H04L 63/1416 370/216 |
| 2002/0032871 A1 * | 3/2002 | Malan ................. | H04L 43/00 726/23 |

(Continued)

Primary Examiner — Don G Zhao
(74) Attorney, Agent, or Firm — Jason L DeFrancesco

(57) ABSTRACT

The present invention relates to a method for automatic derivation of attack paths in a network comprising defining the topology of the network as an enriched network topology, identifying the vulnerabilities of the topology as vulnerabilities information artifacts, building the atomic attack database of the network based on the topology and the vulnerabilities, translating the enriched network topology, the vulnerabilities information artifacts and the atomic attack database into a predefined formal model, executing a predefined SMT-based model checker for the predefined formal model to seek counterexamples and deriving the attack paths from the counterexamples, wherein the defining the topology comprises running, by a computerized data processing unit operatively connected to the network, a module of deep packet inspection of the network to build a network topology based on the information derived from the deep packet inspection module, running, by the computerized data processing unit, a module of active queries of the network to add further information to the network topology based on the information derived from the active queries to build the enriched network topology, wherein the identifying the vulnerabilities comprises running, by the computerized data processing unit, a vulnerability assessment module to identify the vulnerabilities information artifacts of each node of the network based on the matching between nodes information of the enriched network topology and known vulnerabilities of a predefined vulnerabilities database and wherein the building the atomic attack database comprises finding, by the computerized data processing unit, one or more atomic attacks for the network as preconditions and actions to capture the state of the system at a given moment in time, wherein the actions are expressed in terms of a set of features of said nodes.

14 Claims, 2 Drawing Sheets

(56) References Cited

U.S. PATENT DOCUMENTS

| | | | |
|---|---|---|---|
| 2004/0093521 A1* | 5/2004 | Hamadeh | H04L 69/161 |
| | | | 726/22 |
| 2006/0218640 A1* | 9/2006 | Lotem | G06F 21/577 |
| | | | 726/25 |
| 2014/0115706 A1* | 4/2014 | Silva | H04L 63/1491 |
| | | | 726/23 |
| 2018/0367563 A1* | 12/2018 | Pfleger de Aguiar | H04L 41/12 |
| 2019/0141058 A1* | 5/2019 | Hassanzadeh | H04L 41/0631 |
| 2020/0120119 A1* | 4/2020 | Kalra | H04L 63/1425 |

* cited by examiner

METHOD FOR AUTOMATIC DERIVATION OF ATTACK PATHS IN A NETWORK

FIELD OF INVENTION

The present invention relates to the field of network security policy. In particular, the present invention relates to a method for automatic derivation of attack paths in a network.

BACKGROUND ART

Even well administered networks are vulnerable to attacks due to the security ramifications of offering a variety of combined services. That is, services that are secure when offered in isolation nonetheless provide an attacker with a vulnerability to exploit when offered simultaneously.

Many current tools address vulnerabilities in the context of a single host. Nevertheless, it is important to address vulnerabilities due to the configuration of various hosts in a network. Securing cyber-physical systems (CPS) and Internet of Things (IoT) systems requires the identification of how interdependence among existing atomic vulnerabilities may be exploited by an adversary to stitch together an attack that can compromise the system.

Network attack path analysis is an important method for analyzing the security status of computer network, which can automatically analyze the correlation between network vulnerabilities and potential threats resulting from vulnerabilities.

Usually, an association analysis of vulnerabilities and related information is made and properties are abstracted to construct atomic attacks and corresponding atomic attack database. A network attack model is constructed from network connection and host configuration. Via matching atomic attacks in attack database, a comparison algorithm is employed to mine potential attack paths that may lead to specified attack goals.

An integral part of modelling the global view of network security is constructing attack graphs, wherein an accurate attack graphs play a significant role in systems security. Manual attack graph construction is tedious, error-prone, and impractical for attack graphs larger than a hundred nodes. Automated techniques for generating and analyzing attack graphs are known.

A well-known approach uses existing model-checking tools and an architecture description tool to generate an attack graph that enumerates the set of all possible sequences in which atomic-level vulnerabilities can be exploited to compromise system security. The architecture description tool captures a formal representation of the networked system, its atomic vulnerabilities, their pre- and post-conditions, and security property of interest. A model-checker is employed to automatically identify an attack sequence in the form of a counterexample. The model-checker parses the counterexamples, encodes those for specification relaxation, and iterates until all attack sequences are revealed. Finally, a visualization tool may generate a graphical representation of the generated attack graph.

There is, therefore, the need to ensure that accurate attack paths and related attack graphs are generated.

BRIEF DESCRIPTION OF THE INVENTION

The object of the present invention is to provide a method capable of generate in a most accurate way attack paths using a Satisfiability Modulo Theories (SMT)-based model checker.

According to the present invention is described, therefore, a method for automatic derivation of attack paths in a network.

The method for automatic derivation of attack paths in a network comprises:
  defining the topology of the network as an enriched network topology based on packets exchanged in the network;
  identifying the vulnerabilities of the topology as vulnerabilities information artifacts;
  building the atomic attack database of the network based on the topology and the vulnerabilities;
  translating the enriched network topology, the vulnerabilities information artifacts and the atomic attack database into a predefined formal model;
  executing a predefined SMT-based model checker for the predefined formal model to seek counterexamples; and
  deriving the attack paths from the counterexamples;
wherein the defining the topology comprises:
  running, by a computerized data processing unit operatively connected to the network, a module of deep packet inspection of the network to build a network topology based on the information derived from the deep packet inspection module;
  running, by the computerized data processing unit, a module of active queries of the network to build an enriched network topology based on further information derived from packets by the active queries to build the enriched network topology and adding the further information to the network topology;
wherein the identifying the vulnerabilities comprises:
  running, by the computerized data processing unit, a vulnerability assessment module to identify the vulnerabilities information artifacts of each node of the network based on the matching between nodes information of the enriched network topology and known vulnerabilities of a predefined vulnerabilities database; and
wherein the building the atomic attack database comprises:
  finding, by the computerized data processing unit, one or more atomic attacks for the network as preconditions and actions to capture the state of the system at a given moment in time, wherein the actions are expressed in terms of a set of features of the nodes.

In a further embodiment, the predefined formal model is a circuit-like formal model.

In a further embodiment, the SMT-based model checker is a circuit-like SMT-based model checker.

In a further embodiment, the circuit-like SMT-based model checker defines a circuit with a global clock that divides the execution into discrete time steps.

In a further embodiment, the circuit comprises:
  primary inputs as ports where data from external input can flow into the circuit;
  primary outputs as ports where the data can flow out of the circuit;
  latches as basic memory elements that can hold the data;
  gates as stateless combinational elements implementing basic logic functions;
  comparators as stateless arithmetic comparators;
  constants as numbers, Boolean values or symbolic constants that output the same value at every of the time steps.

In a further embodiment, the primary inputs are of Boolean or integer type.

In a further embodiment, the primary outputs are of Boolean or integer type.

In a further embodiment, the latches are of Boolean or integer type.

In a further embodiment, the latches store a first value representing the value they hold when the circuit is booted at first time step.

In a further embodiment, the latches are updated with a new value at each subsequent time step.

In a further embodiment, the basic logic functions of the gates are AND, OR, NOT.

In a further embodiment, the gates take the data of Boolean type and return the data of Boolean type.

In a further embodiment, the stateless arithmetic comparators are $\leq, <, =, >, \geq$.

In a further embodiment, the stateless arithmetic comparators take the data of Integer type and return the data of Boolean type.

In a further embodiment, at each of the time steps primary input values of the primary inputs at the current time step are read, wherein the primary input values at the current time step and latches values of the latches at the current time step are processed by the gates, wherein the latches values at a subsequent time step are generated by the comparators, and wherein primary output values of the primary outputs at the current time step are generated by the comparators.

In a further embodiment, for each of the nodes and for each of the features of each of the nodes a latch is created, and wherein the latches values in each of the time steps define the state of the system in each of the time steps.

DESCRIPTION OF THE FIGURES

These and further features and advantages of the present invention will become apparent from the disclosure of the preferred embodiments, illustrated by way of a non-limiting example in the accompanying figures, wherein.

DETAILED DESCRIPTION OF THE INVENTION

Figure 1:
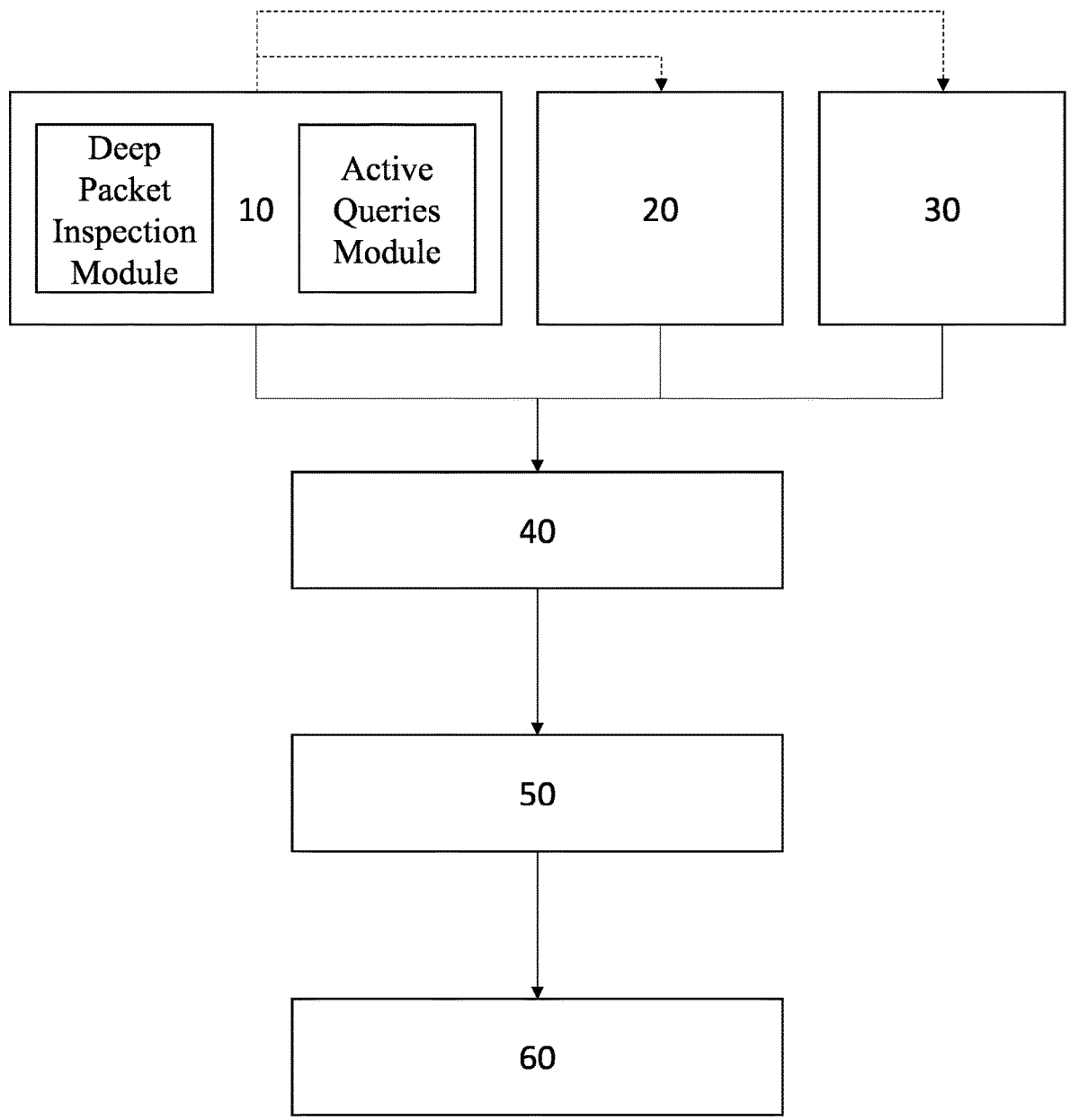
FIG. 1 shows a block diagram according to an embodiment of the present invention.

The present invention relates to a method for automatic derivation of attack paths in a network.

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

The term "network protocol" means, in the present invention, a system of rules between entities on a network, describing how the bytes composing the message to exchange should be structured for the entities to understand each other. Noteworthy examples of network protocols are TCP/IP, Modbus, BACnet.

The term "packet" means, in the present invention, a finite sequence of bytes that represents a message exchanged between the entities on a network. Each protocol defines a particular structure for the packets to be sent and received.

The term "node" means, in the present invention, a device in the network that can receive and/or transmit data through a connection, being it based on a cable or a radio signal. A node is identified with a unique identifier, which could be for instance a MAC address or an IP address.

The term "edge" means, in the present invention, a direct communication of nodes $n_1$ and $n_2$ in the network via protocol p, which could have for instance a notation ($n_1$, p, $n_2$). There might be several edges between two nodes, one per each communication protocol used.

The term "network topology graph" means, in the present invention, an abstraction of the structure of a network, and it can be represented as a Labelled Graph G(N,E,P), where N is the set of nodes, and E is the set of edges, P is the set of protocols such that each edge is a tuple ($n_1$, p, $n_2$) where $n_1, n_2 \in N$, $n_1 \neq n_2$, $p \in P$.

The term "atomic attack" means, in the present invention, an attack involving two nodes of the network. An atomic attack is described by a precondition, and by an action. A precondition is a list of conditions that need to hold for the attack to trigger. An example is: "the target node has vulnerability xyz". An action is the effect of the attack, for instance: "the attacker gains root privileges on the target node".

The term "attack path" means, in the present invention, a path in the network topology graph that starts from a source node $n_1$, assumed to be an attacker, and that ends in a target node $n_{m+1}$, assumed to be the victim, by traversing edges $e_1$, $e_2, \ldots, e_m$, which could have for instance a notation ($e_1$, $e_2$, $\ldots, e_m$). Each edge represents the execution of an atomic attack. Furthermore, each node in the path other than $n_1$ is assumed to run a software that is vulnerable to an attack, for instance a buffer overflow.

The term "deep packet inspection" or "DPI" means, in the present invention, a technique that consists in listening to the network traffic and inspecting the captured packets to derive properties of the network. For instance, the information about the source and the destination of a sufficiently large number of packets may be exploited to build the network topology graph.

The term "active query" or "AQ" means, in the present invention, a method to derive knowledge of the network by sending tailored packets to a network device in order to force a reply containing desired information, such as the OS version running on a device.

The term "vulnerability" means, in the present invention, a weakness of a hardware component or of a software used by a device that could potentially be exploited by an attacker to compromise the system, to steal sensitive information, or to gain administration privileges on the device. Lists of known vulnerabilities may can be obtained via publicly available online resources, such as the one provided by the organization Mitre in form of JSON, XML or other machine-readable formats.

The term "vulnerability assessment" means, in the present invention, a module, of software or hardware type, that receives as input a list of software installed on a machine and it outputs the set of vulnerabilities that affects the software, based on a database of vulnerabilities.

The term "formal model" means, in the present invention, a set of techniques that approach the solution of a problem by recasting it into an equivalent one but expressed in a formal language, for instance, a set of mathematical or logical expressions. These expressions can then be solved by an automated tool, and the solution can be translated back into a solution in the original problem. One of the most prominent techniques is Model Checking, where the problem is translated into a finite state automaton. Model Checking is successfully employed in industrial settings for determining the safety of hardware and software by a model checker.

The method for automatic derivation of attack paths in a network according to the present invention is herewith described with reference to figures FIG. 1, which shows a block diagram according to an embodiment of the present invention, and in connection with FIG. 2, which shows a circuit modelling the network according to an embodiment of the present invention.

The method comprises defining the topology of the network as an enriched network topology based on packets exchanged in said network, as illustrated in the block 10.

Figure 2:
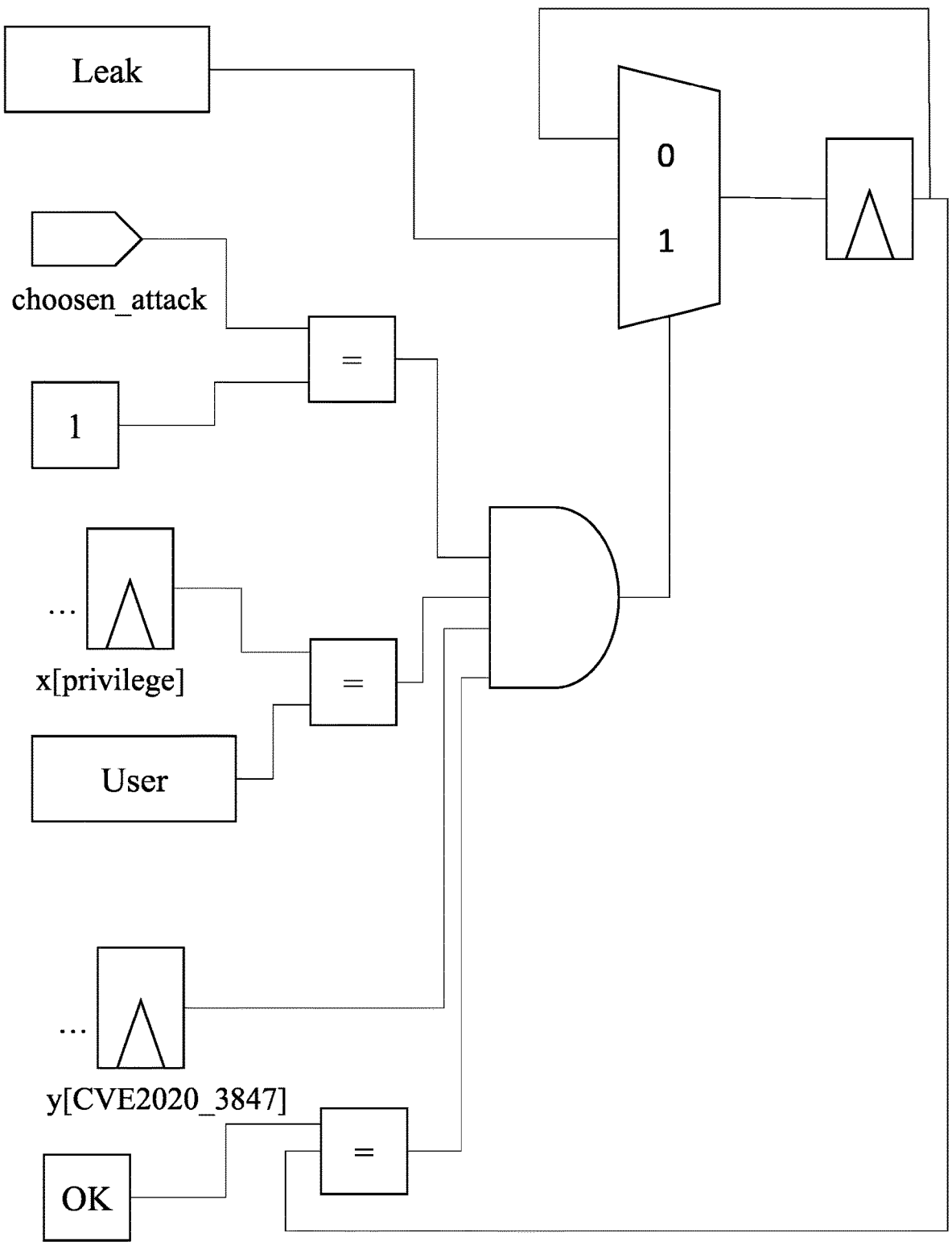
FIG. 2 shows a circuit modelling the network according to an embodiment of the present invention.

In particular, the defining the topology of the network comprises running, by a computerized data processing unit operatively connected to said network, a module of deep packet inspection of the network and a module of active queries of the network, as illustrated in the sub-blocks of the block 10 in FIG. 1.

The module of deep packet inspection (DPI) builds a network topology based on the information derived from the packets by the deep packet inspection module.

Thus, the topology of the network can be compiled automatically from the network by means of a machine attached to the same network and performing DPI on the traffic that runs through the network. For example, the topology of the network can be reconstructed as follows: for each packet, create a node for the source, a node for the destination, and an edge, marked with the recognized protocol, that connects the two nodes. It is therefore possible to identify the devices on the network in a precise manner and to construct the corresponding topology graph of the network. This information can be easily exported in a machine-readable format. DPI can also be used to infer information about the Operating System and the Software running on a particular device.

The module of active queries (AQ) builds the enriched network topology based on further information derived from the packets by the active queries to build said enriched network topology and adding the further information to the network topology, as already defined with the deep packet inspection.

A sufficiently long run of a DPI and an AQ modules can produce a very detailed knowledge base of the network under examination.

Afterwards, the method comprises identifying the vulnerabilities of the topology as vulnerabilities information artifacts, as illustrated in the block 20.

In particular, identifying the vulnerabilities comprises running, by the computerized data processing unit, a vulnerability assessment module to identify the vulnerabilities information artifacts of each node of the network based on the matching between nodes information of the enriched network topology and known vulnerabilities of a predefined vulnerabilities database.

In particular, the identifying the vulnerabilities comprises running, by the computerized data processing unit, a vulnerability assessment module to identify the vulnerabilities information artifacts of each node of the network based on the matching between nodes information of the enriched network topology and known vulnerabilities of a predefined vulnerabilities database.

As illustrated by the dotted arrow connecting the block 10 to the block 20, the identifying the vulnerabilities matches the information about the software available on the network nodes obtained by the DPI and the AQ modules with a vulnerability database, to add at each node of the network graph with the known vulnerabilities associated with its running software. This process produces the Vulnerability Information artifact.

Afterwards, the method comprises building the atomic attack database of the network based on the topology and the vulnerabilities, as illustrated in the block 30.

In particular, building the atomic attack database comprises finding, by the computerized data processing unit, one or more atomic attacks for the network as preconditions and actions to capture the state of the system at a given moment in time, wherein the actions are expressed in terms of a set of features of the nodes.

As illustrated by the dotted arrow connecting the block 10 to the block 30, the building the atomic attack database uses the information about the software available on the network nodes obtained by the DPI and the AQ modules with a vulnerability database, to capture the state of the system at a given moment in time.

Therefore, the Atomic Attack Database is a list of Atomic Attacks described in terms of preconditions and actions that are in turn expressed in terms of a set of features of the nodes that are necessary to capture the state of the system at a given moment in time, which could be better understood by the following examples.

Considering the following features:
privilege: the level of permissions that a user possessed with respect to a node. It can assume values in {none, user, admin}.
health: the health status of a node. It can assume values in {ok, leak}.
CVE-2016-3266: whether the vulnerability is present on a node. It can assume values in {true, false}. This vulnerability allows a local user to gain admin privileges on the target node.
CVE-2020-3847: whether the vulnerability is present on a node. It can assume values in {true, false}. This vulnerability allows a remote user to leak memory on the target node.

Given a node x and a feature k, we use the notation x[k] to refer to the current state of the node, and x'[k] to refer to the next state of the node. The features can be used to describe two atomic attacks as follows, where we assume that x and y are connected in the network.

A first attack could be formalized as follow: CVE-2020-3847 memory leak
Source machine: x
Target machine: y
Precondition:
(x[privilege]=user)∧
(y[health]=ok)∧
(y[CVE_2020_3847]=true)
Postcondition:
y'[health]=leak A second attack could be formalized as follow: CVE-2016-3266 privilege gain
Source and Target machines are the same: x
Precondition:
(x[privilege]=user)∧
(x[CVE_2016_3266]=true)
Postcondition:
x'[privilege]=admin We assume that the database has been compiled by security experts and its content is available in a machine-readable format such as JSON, XML, or CSV.

Afterwards, the method comprises translating the enriched network topology, the vulnerabilities information artifacts and the atomic attack database into a predefined formal model, as illustrated in the block 40. As illustrated by the solid arrows converging to the block 40 from blocks 10, 20 and 30, the translator module receives as inputs the Network Topology Information, the Vulnerabilities Information, the Atomic Attack Database, and it translates the model into a predefined formal model.

In an embodiment, the predefined formal model is a circuit-like formal model.

Afterwards, the method comprises executing a predefined SMT-based model checker for the predefined formal model to seek counterexamples, as illustrated in the block 50. As illustrated by the solid arrow from block 40 to block 50 executing a predefined SMT-based model checker is done over the predefined formal mode.

In an embodiment, the SMT-based model checker is a circuit-like SMT-based model checker. Moreover, the circuit-like SMT-based model checker defines a circuit with a global clock that divides the execution into discrete time steps. Preferably, the comprises:

- primary inputs as ports where data from external input can flow into the circuit;
- primary outputs as ports where the data can flow out of the circuit;
- latches as basic memory elements that can hold the data;
- gates as stateless combinational elements implementing basic logic functions;
- comparators as stateless arithmetic comparators;
- constants as numbers, Boolean values or symbolic constants that output the same value at every of the time steps.

The input language may be defined as the Intrepid model checker. In particular, the Intrepid input language, as well different circuit-like model checkers, allows the description of a circuit, with a global clock that divides the execution into discrete time steps. The circuit consists of:

- Primary inputs (PI): ports where external input data can flow into the circuit. They can be of type Boolean or Integer.
- Primary outputs (PO): ports where data can flow out the circuit. They can be of type Boolean or Integer.
- Latches: basic memory elements that can hold data. They can hold values of type Boolean or integer. Moreover, they store an initial value (first value) representing the value they hold when the circuit is booted at first time (time step 0). The latches are updated with a new value at each subsequent time step.
- Gates: stateless combinational elements implementing basic logic functions, such as AND, OR, NOT. They take data of type Boolean and they return a Boolean.
- Comparators: stateless arithmetic comparators such as $\leq$, $<$, $=$, $>$, $\geq$. The take data of type Integer and they return a Boolean.
- Constants: numbers, Boolean values, or symbolic constants that output the same value at every time step.

The circuit operates as follows: at each of the time steps primary input values of the primary inputs (PI) at the current time step are read. These primary input values at the current time step and latches values of the latches at the current time step are processed by the gates. The latches values at a subsequent time step are generated by the comparators, and primary output (PO) values of the primary outputs at the current time step are generated by said comparators. For each of the nodes and for each of the features of each of the nodes a latch is created. Moreover, the latches values in each of the time steps define the state of the system in each of the time steps.

To perform the translation, the collection all the interesting states of the system needs to be done. These states can be gathered from the atomic attack database: they are the set of all the features F mentioned in every atomic attack. Then, for each node n, and for each feature k, a latch n[k] is created, for a total of |N|×|F| latches. The set values stored in these latches at time t is the state of the network at time t. Each latch is initialized with the state of the network just before the first atomic attack begins. In the translation the implicit assumption that one atomic attack takes exactly one step to execute is used. At each time step an atomic attack may occur. Each atomic attack is identified with an integer id. In the translation a PI chosen_attack is created: this input simulates a non-deterministic choice of an attack that is triggered at a time step. The next-state logic of each latch is then computed with the circuit-equivalent of a "case-statement" depending on chosen_attack and the preconditions for each attack.

Considering the following example. Suppose the network consists of two nodes x and y connected by an edge and consider the setup of Example 1. Then the circuit that models the next state function of the latch y[health] is the one reported in FIG. 2 (in the figure the next state functions of x[privilege], y[CVE_2020_3847], and the rest of the circuit is not shown).

The circuit-like translation described above can be passed to Intrepid via its Python API. The API exposes functions to create inputs, latches, gates, constants, comparators, and to set the initial and next state function of the latches.

The further thing that is needed for the model checker to run is the property. A property is a condition that must hold true in every state of the network. For example, the property never(y[privilege]=admin)

expresses that in the network the attacker must never be able to gain admin privileges on node y. In a circuit-like translation, properties can be expressed with small sub-circuits, whose output is set in the model checker to be always at a fixed value.

Afterwards, the method comprises deriving the attack paths from the counterexamples, as illustrated in the block 60.

A Model Checker execution can take a very long execution time, but eventually terminates by declaring that the property always holds in the system or by providing a counterexample, a set of states that from the initial states leads to the violation of the property. In our case the violation of the property corresponds to having found an attack path that has made possible, for instance, the acquisition of admin rights on a target machine.

A counterexample from Intrepid lists the values for each latch and input at every time step, and hence it is possible to reconstruct every single atomic attack for each step.

The invention claimed is:

1. A method for automatic derivation of attack paths in a network comprising:
   - defining a topology of said network as an enriched network topology based on packets exchanged in said network;
   - identifying vulnerabilities of said enriched network topology as vulnerabilities information artifacts;

building an atomic attack database of said network based on said topology and said vulnerabilities;

translating said enriched network topology, said vulnerabilities information artifacts and said atomic attack database into a predefined formal model;

executing a predefined Satisfiability Modulo Theories (SMT)-based model checker for said predefined formal model to seek counterexamples; and deriving said attack paths from said counterexamples; wherein said defining the topology comprises:

running, by a computerized data processing unit operatively connected to said network, a module of deep packet inspection of said network to build the enriched network topology based on information derived from said packets by said deep packet inspection module;

running, by said computerized data processing unit, a module of active queries of said network to build said enriched network topology based on further information derived from said packets by said active queries to build said enriched network topology and adding said further information to said enriched network topology; wherein said identifying the vulnerabilities comprises:

running, by said computerized data processing unit, a vulnerability assessment module to identify said vulnerabilities information artifacts of each node of said network based on the matching between nodes information of said enriched network topology and known vulnerabilities of a predefined vulnerabilities database; and wherein said building the atomic attack database comprises:

finding, by said computerized data processing unit, one or more atomic attacks for said network as preconditions and actions to capture a state of the system at a given moment in time, wherein said actions are expressed in terms of a set of features of said nodes;

wherein said SMT-based model checker is a circuit-like SMT-based model checker that defines a circuit with a global clock that divides the execution into discrete time steps.

2. The method for automatic derivation of attack paths in the network according to claim 1, wherein said predefined formal model is a circuit-like formal model.

3. The method for automatic derivation of attack paths in network according to claim 1, wherein said circuit comprises: primary inputs as ports where data from external input can flow into said circuit; primary outputs as ports where said data can flow out of said circuit; latches as basic memory elements that can hold said data; gates as stateless combinational elements implementing basic logic functions; comparators as stateless arithmetic comparators; constants as numbers, Boolean values or symbolic constants that output the same value at every one of said time steps.

4. The method for automatic derivation of attack paths in the network according to claim 3, wherein said primary inputs are of Boolean or integer type.

5. The method for automatic derivation of attack paths in the network according to claim 3, wherein said primary outputs are of Boolean or integer type.

6. The method for automatic derivation of attack paths in the network according to claim 3, wherein said latches are of Boolean or integer type.

7. The method for automatic derivation of attack paths in the network according to claim 3, wherein said latches store a first value representing the value they hold when said circuit is booted at first time step.

8. The method for automatic derivation of attack paths in the network according to claim 7, wherein said latches are updated with a new value at each subsequent time step.

9. The method for automatic derivation of attack paths in the network according to claim 3, wherein said basic logic functions of said gates are AND, OR, NOT.

10. The method for automatic derivation of attack paths in the network according to claim 3, wherein said gates take said data of Boolean type and return said data of Boolean type.

11. The method for automatic derivation of attack paths in the network according to claim 3, wherein said stateless arithmetic comparators are ≤, <, =, >, ≥.

12. The method for automatic derivation of attack paths in the network according to claim 3, wherein said stateless arithmetic comparators take said data of Integer type and return said data of Boolean type.

13. The method for automatic derivation of attack paths in the network according to claim 3, wherein at each of said time steps primary input values of said primary inputs at the current time step are read, wherein said primary input values at said current time step and latches values of said latches at said current time step are processed by said gates, wherein said latches values at a subsequent time step are generated by said comparators, and wherein primary output values of said primary outputs at said current time step are generated by said comparators.

14. The method for automatic derivation of attack paths in the network according to claim 13, wherein for each of said nodes and for each of said features of each of said nodes a latch is created, and wherein said latches values in each of said time steps define said state of the system in each of said time steps.

\* \* \* \* \*